H. C. WAITE.
POWER TRANSMITTING MECHANISM.
APPLICATION FILED SEPT. 1, 1909.
953,308.
Patented Mar. 29, 1910.
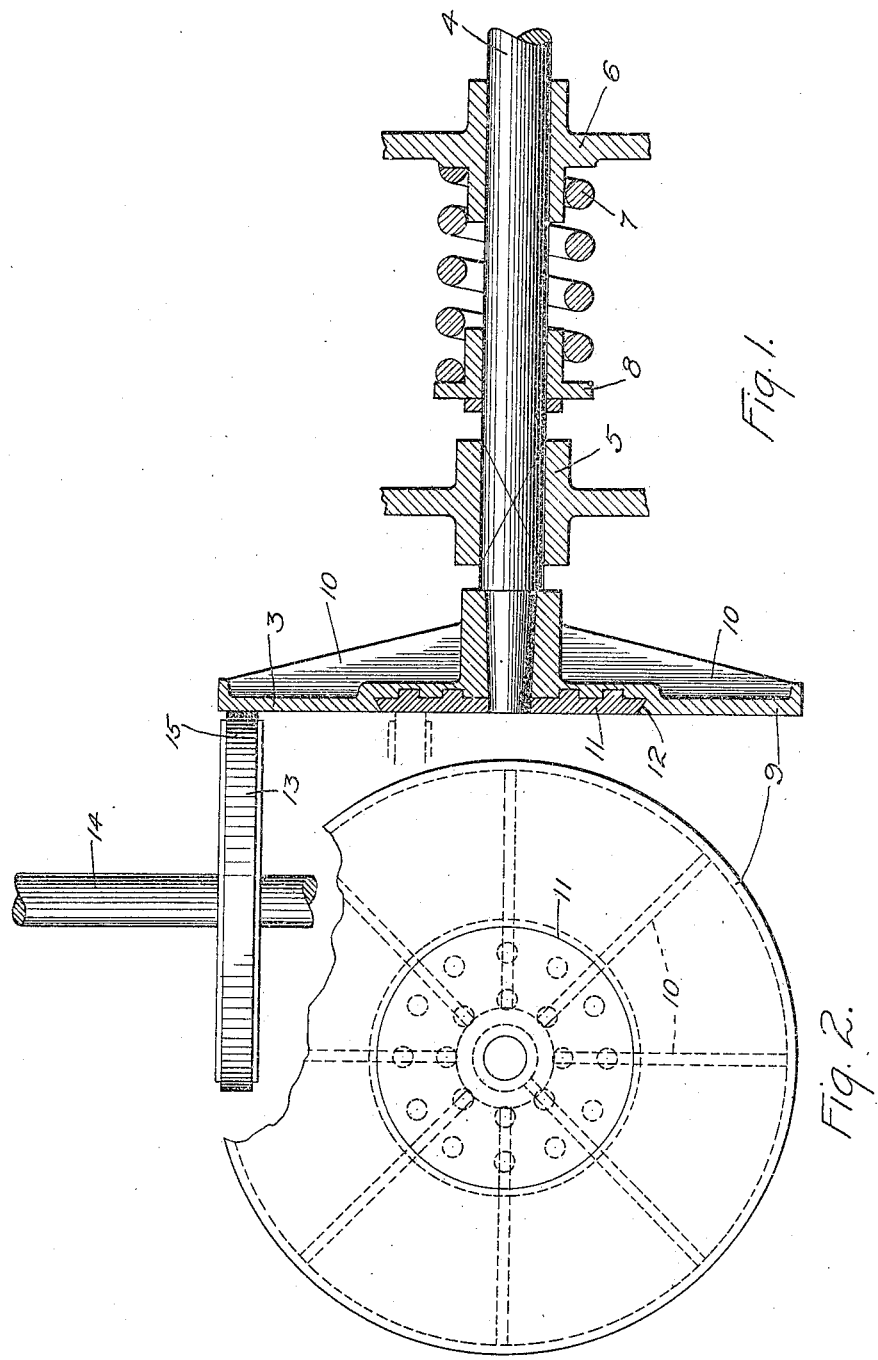
WITNESSES:
INVENTOR.
BY
ATTORNEY IN FACT.

UNITED STATES PATENT OFFICE.

HARRY C. WAITE, OF MILWAUKEE, WISCONSIN, ASSIGNOR OF ONE-HALF TO SAMUEL W. WATKINS, OF MILWAUKEE, WISCONSIN.

POWER-TRANSMITTING MECHANISM.

953,308.  Specification of Letters Patent.  Patented Mar. 29, 1910.

Application filed September 1, 1909. Serial No. 515,580.

*To all whom it may concern:*

Be it known that I, HARRY C. WAITE, a citizen of the United States, and a resident of Milwaukee, in the county of Milwaukee and State of Wisconsin, have made a new and useful Invention in Power-Transmitting Mechanism, of which the following is a specification.

This invention relates to power-transmitting mechanism and more particularly to speed change devices adapted to be used in connection therewith.

Various forms of friction gearing have from time to time been used and in the development of motor vehicles, numerous attempts have been made to produce a satisfactory friction gear device for the power-transmitting mechanism. In this friction gearing, which generally consists of two members, a driving and a driven member, the driven member, the outer periphery of which contacts with the face of the driving member, is moved across the face of the driving member to vary the effective turning moment of the gearing. In order to obtain a maximum friction between the outer periphery of the driven member and the face of the driving member, various expedients have been resorted to. The outer periphery, or the contact face of the driven member, has been made of wood, paper fiber and compressed cork, as well as of various other materials, and the face of the driving member has been covered with such materials as aluminum, aluminum alloys, as well as fiber and leather. I have found by experience that the cover or facings for the driving member, such as aluminum, aluminum alloys, fiber and leather, which are desirable on account of their relatively high coefficient of friction, are not satisfactory as now used, because they are unable to stand up under the wear and tear. I find that material such as aluminum quickly becomes grooved and rigid, especially at that portion of the face of the driving member which is most used during the normal operation of the gearing device when used in motor vehicles. The portion near the center of the driving member does not receive such hard wear or abuse as the outer portion does.

An object of this invention is to produce a friction gearing, or gear device in which many of the faults inherent in such devices with which I am familiar are overcome.

A further object is to produce a friction gear member, such as the driving member, having the driving face made up of materials having different coefficients of friction.

A still further object is to produce a driving member for friction gearing, the contact face of which is divided into several areas of different material of varying hardness whereby the desired friction between the driving and driven elements of the device is obtained throughout the range of loads to which the device is subjected.

These, as well as other objects will readily appear to those skilled in the art, I attain by means of the device described in the specification and illustrated in the accompanying drawings, throughout the several views of which like parts are denoted by like characters.

In the drawings, Figure 1 is a more or less diagrammatic view of a device embodying this invention; and, Fig. 2 is a fragmentary face view of the driving member of the device.

In carrying out this invention, any desired form of friction gear device may be employed and I have only attempted by way of illustration to show and describe a simple form of device in which a driving member 3 is secured to a shaft 4 adapted to be driven by an engine or other suitable motor, (not shown). The shaft 4 is journaled in suitable bearings, one of which is shown at 5, (the other not being shown) and is adapted to be moved longitudinally by means of a device 6 utilized for compressing a spring 7 surrounding the shaft and which abuts against a collar 8 rigidly secured to the shaft. The driving member is preferably formed of cast iron and the circular plate 9 thereof, which is reinforced by means of ribs 10, is accurately machined to present a smooth driving face annular in form. The center of the driving member is filled in with a softer material 11 than cast-iron and the face thereof is machined so as to lie in the plane of the face of the annular portion 9. This circular center portion, which is preferably dovetailed into the driving member and the sides of which are undercut as at 12 to receive the same, may be formed of copper, aluminum or any other suitable material having a high coefficient of friction.

A driven member 13 mounted on a sliding rotatable shaft 14 is provided with a face 15 of fiber, wood, compressed cork or any other suitable material having a high coefficient of friction. As is now common, this material may be clamped between two plates, as shown in the drawings, and machined so as to present a smooth surface for contacting with the driving face of the driving member. When friction gear devices are used in connection with the power-transmission mechanism of vehicles, the driven member throughout, what may be termed, the normal operation of the vehicles will occupy a position in contact with the driving member at points far removed from the axis of the driving member and the driven member is only moved under normal operation near the center of the driving member during slow speeds and during reverses. When the torque on the driven member is lowered, it will under normal conditions contact with the outer portion of the face of the driving member and a high degree of friction between the two contacting members is not necessary, but when the torque is increased and the driven member is moved toward the center of the driving member or toward its axis, a large degree of friction between the members is necessary and it will be seen that by means of my invention I provide a device which meets the requirements especially for motor vehicle speed change devices admirably.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim is:

1. As an article of manufacture, a friction gear driving member provided with a driving face, the portion near the center of which has a greater coefficient of friction than the portion removed from the center.

2. As an article of manufacture, a driving member for friction gearing having a driving face provided with an outer annulus of hard material and a center of softer material.

3. As an article of manufacture, a driving member for friction gearing, the face of which has a cast-iron outer annulus and an alloy center.

4. As an article of manufacture, a driving member for friction gearing, the face of which has a cast-iron annulus and an aluminum alloy center.

5. In friction gearing, a driven member, and a driving member having a face in contact with said driven member and provided with portions having different coefficients of friction.

6. In friction gearing, a driven member, and a driving member having a face in contact with the driven member and provided with a hard high-speed face and a softer low-speed face.

7. In friction gearing, a driven member and a driving member having a face in contact with the driven member and provided with a cast-iron high-speed face and an alloy low-speed face.

In testimony whereof, I have hereunto subscribed my name this 26th day of August, 1909.

HARRY C. WAITE.

Witnesses:
ARTHUR L. RICHARDS,
A. B. KADDATZ.